United States Patent
Schmid et al.

(10) Patent No.: US 12,433,729 B2
(45) Date of Patent: Oct. 7, 2025

(54) DENTAL LIGHT POLYMERIZATION DEVICE

(71) Applicant: Solventum Intellectual Properties Company, Maplewood, MN (US)

(72) Inventors: Rudolf Schmid, Eichenau (DE); Korbinian Gerlach, Gauting (DE); Stefan K. Welker, Geltendorf (DE); Angelika Hofmann, Munich (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 898 days.

(21) Appl. No.: 17/250,426

(22) PCT Filed: Jul. 23, 2019

(86) PCT No.: PCT/IB2019/056297
§ 371 (c)(1),
(2) Date: Jan. 20, 2021

(87) PCT Pub. No.: WO2020/026075
PCT Pub. Date: Feb. 6, 2020

(65) Prior Publication Data
US 2021/0282911 A1    Sep. 16, 2021

(30) Foreign Application Priority Data
Jul. 31, 2018 (EP) .................................. 18186444

(51) Int. Cl.
*A61C 13/15*   (2006.01)
(52) U.S. Cl.
CPC ...... *A61C 19/004* (2013.01); *A61C 2204/002* (2013.01)
(58) Field of Classification Search
CPC ............ A61C 19/004; A61C 2204/002; A61C 19/003; F21V 7/0091
See application file for complete search history.

(56) References Cited

U.S. PATENT DOCUMENTS 5,059,013 A    10/1991 Jain
5,367,590 A    11/1994 Davenport
(Continued)

FOREIGN PATENT DOCUMENTS

CN    105411715    9/2017
EP     1314402    5/2003
(Continued)

OTHER PUBLICATIONS

International Search report for PCT International Application No. PCT/IB2019/056297 mailed on Nov. 15, 2019, 4 pages.
(Continued)

*Primary Examiner* — Thomas C Barrett
*Assistant Examiner* — Shannel Nicole Belk

(57) ABSTRACT

A dental light polymerization device has an intra-oral tip portion and a handle portion. The dental light polymerization device has a polymerization light source and a light mixing element. The polymerization light source has a first LED exhibiting a first light emission peak wavelength and a second LED exhibiting a second light emission peak wavelength. The first and second LED each are configured for emitting visible light within a wavelength range of 380 nm to 495 nm. The first and second light emission peak wavelength differ from each other by at least 10 nm. The light mixing element is formed of a solid transparent body that has a rear portion and an adjacent front portion. The rear portion has the shape of a square-based truncated pyramid. Further, the front portion has a convex shape. The rear portion forms a rear end of the light mixing element and the front portion forms a front end of the light mixing element. The rear end forms a first diagonal dimension and the rear portion, adjacent the front portion, forms a greater second diagonal dimension. The light mixing element is arranged with the rear end facing the polymerization light source and (Continued)

with the front end facing away from the polymerization light source.

13 Claims, 4 Drawing Sheets

(56) References Cited

U.S. PATENT DOCUMENTS

| | | | |
|---|---|---|---|
| 10,257,901 B2 | 4/2019 | Osten | |
| 2003/0218880 A1 | 11/2003 | Brukilacchio | |
| 2004/0248059 A1 | 12/2004 | Katsuda | |
| 2006/0122619 A1* | 6/2006 | Kablik | A61C 19/004 |
| | | | 606/88 |
| 2008/0030974 A1* | 2/2008 | Abu-Ageel | F21V 5/007 |
| | | | 362/555 |
| 2008/0268401 A1 | 10/2008 | Kim | |
| 2013/0101953 A1* | 4/2013 | Stone | A61B 1/0684 |
| | | | 433/29 |
| 2013/0273493 A1 | 10/2013 | Noui et al. | |
| 2013/0294066 A1 | 11/2013 | Lillelund et al. | |
| 2017/0231733 A1* | 8/2017 | Schmid | A61C 19/004 |
| | | | 433/29 |
| 2017/0328542 A1* | 11/2017 | He | F21V 14/02 |
| 2017/0340532 A1 | 11/2017 | Montgomery | |
| 2018/0364464 A1 | 12/2018 | Senn et al. | |

FOREIGN PATENT DOCUMENTS

| | | |
|---|---|---|
| JP | 2000024007 A | 1/2000 |
| KR | 1576646 | 12/2015 |
| WO | WO 1997-036552 | 10/1997 |
| WO | WO 02-11640 | 2/2002 |
| WO | WO 2013-050587 | 4/2013 |
| WO | WO 2015-164180 | 10/2015 |

OTHER PUBLICATIONS

1507 Extended EP Search Report for E18186444.8, PCT/IB2019/056297, Jan. 4, 2019, 3 pages.

International Preliminary Report on Patentability for Application No. PCT/IB2019/056297, mailed on Feb. 11, 2021, pages.

* cited by examiner

DENTAL LIGHT POLYMERIZATION DEVICE

CROSS REFERENCE TO RELATED APPLICATIONS

This application is a national stage filing under 35 U.S.C. 371 of PCT/IB2019/056297, filed Jul. 23, 2019, which claims the benefit of European Application No. 18186444.8, filed Jul. 31, 2018, the disclosure of which is incorporated by reference in its/their entirety herein.

FIELD OF THE INVENTION

The invention relates to a dental light polymerization device that has a first and a second LED exhibiting a first and second light emission peak wavelength that differ by at least 10 nm, and a light mixing element for mixing light emitted from the first and second LED into a light beam having a uniform light intensity distribution.

BACKGROUND ART

Light hardenable or light curable materials are widely used in dentistry for the restoration of teeth. Many of such materials are made to provide optical properties that resemble those of natural teeth. Further such materials typically can be placed precisely and conveniently, hardened instantly, and the hardened material is typically relatively durable. Accordingly these materials are favored alternatives to less pleasant looking and over time self-hardening materials, like for example amalgam.

Light hardenable materials often include a polymerizable matrix material and filler materials including colorants, and may initially be generally soft or flowable so that they can be applied in a desired location and shape. For example, for restoration of a tooth the dental material may be filled into a tooth cavity and shaped so that the restored tooth resembles a natural tooth. Once the desired shape has been formed, the material may be cured by exposing it to light of a desired wavelength. The light typically activates photoinitiators in the dental material that cause the matrix material to polymerize.

The use of dental materials that are hardenable by blue light within a wavelength of between about 450 and 500 nm (nanometers) has become common in dentistry. Accordingly, light-emitting devices used for hardening such dental materials typically emit light within such a wavelength range. Such a light-emitting device is for example available from 3M Deutschland GmbH, Germany, under the trade designation Elipar™ S10.

WO 2015/164180 A1 discloses a dental light irradiation device which is adapted to emit blue light. The device has a light source, means for collimating light emitted from the light source, and a light guide. The light collimating means comprises a plano-convex lens and a reflector formed by a conical hollow ring-shaped structure. The reflector is arranged such that its inner cross-section widens toward the lens.

Although existing devices provide certain advantages there is still a desire to provide a light device which is provides for hardening of the dental materials at maximized reliability and efficiency.

SUMMARY OF THE INVENTION

The invention relates to a dental light polymerization device. The dental light polymerization device comprises an intra-oral tip portion and a handle portion. The dental light polymerization device further comprises a polymerization light source and a light mixing element.

The polymerization light source comprises at least a first and a second LED (light emitting diode). The first LED exhibits a first light emission peak wavelength, and the second LED exhibits a second light emission peak wavelength. The first and second LED each are configured for emitting visible light within a wavelength range of 380 nm to 495 nm. The first and second light emission peak wavelength differ from each other by at least 10 nm.

The light mixing element is formed of a solid transparent body having a rear portion and an adjacent front portion. The rear portion has the shape of a square-based truncated pyramid. A center axis of the pyramid forms an optical axis. Further, the front portion has a convex shape. The rear portion forms a rear end of the light mixing element and the front portion forms a front end of the light mixing element.

The rear end forms a first diagonal dimension. Further, the rear portion, adjacent the front portion, forms a greater second diagonal dimension. The light mixing element is arranged with the rear end facing the polymerization light source. The light mixing element is arranged with the front end facing away from the polymerization light source.

The invention is advantageous in that it provides a dental light polymerization device which is adapted to emit uniform light. In particular a light beam emitted by the dental light polymerization device along an optical axis has a uniform (or substantially uniform) light intensity distribution in a plane perpendicular to the optical axis. This means that the light beam at its outer periphery has the same (or essentially the same) light intensity as the light beam at its inner periphery. This allows for hardening dental materials at maximized efficiency because an area of a dental material is fully irradiated at an intensity that is appropriate to cause the dental material to harden. Further thereby the reliability is maximized because the risk of irradiating the dental material at insufficient light intensity is minimized.

Preferably the first and second diagonal dimension each extend perpendicular to the optical axis. Further, the first diagonal dimension is preferably formed by a square-shaped surface that forms the rear end of the light mixing element. The second diagonal dimension is preferably formed by a square-shaped cross-section at a transition between the rear and the front portion. The second diagonal dimension is measured between opposing edges directly at the transition to the front portion. Preferably the front portion is axially symmetric about the optical axis.

Preferably the polymerization light source and the light mixing element are optically coupled such that light emitted from the polymerization light source passes the light mixing element. The light mixing element is preferably configured for mixing the light as it passes through the light mixing element. The light is preferably mixed in that it is reflected multiple times by the light mixing element. Preferably the reflection is based on a total reflection between the light mixing element and air that surrounds the light mixing element. Preferably the light mixing element is not coated, in particular may not be mirrored.

The first light emission peak wavelength, as referred to herein, means that over a light spectrum emitted from the first LED, the light intensity forms a maximum at the first light emission peak wavelength. Further, the second light emission peak wavelength, as referred to herein, means that over a light spectrum emitted from the second LED, the light intensity forms a maximum at the second light emission peak wavelength.

In an embodiment the first light emission peak wavelength is a particular wavelength within a range of 440 nm to 460 nm and the second light emission peak wavelength is a particular wavelength within a range of 460 nm to 485 nm. This embodiment may be particularly advantageous for polymerizing a dental material which comprises Camphorquinone as photoinitiator. Accordingly for polymerizing dental materials comprising other photoinitiators alternative ranges for the first and second light emission peak wavelength may be used. In one example the first light emission peak wavelength is 457 nm and the second light emission peak wavelength is 469 nm. It is noted that LEDs as they can be used as the first and the second LED of the invention are typically available with light emission peak wavelengths within the specified ranges. For providing the dental light polymerization device of the invention LEDs may be selected which exhibit light emission peak wavelengths that are possibly far apart from each other. Although it would be preferable to use a first LED exhibiting a first light emission peak wavelength of 440 nm and a second LED exhibiting a second light emission peak wavelength of 485 nm to achieve a difference of 45 nm, it has been found that a difference of 10 nm has advantages for producing dental light polymerization devices at greater volumes. This is because the light emission peak wavelengths of LEDs typically follow a normal distribution so that using LEDs with only extreme light emission peak wavelengths would be economically disadvantageous.

In an embodiment the intra-oral tip portion comprises a light guide that has a rear end and a front end. The front end of the light guide preferably forms a light output of the dental light polymerization device. The front end of the light guide may be formed by a curved portion of the light guide. The front end of the light guide is preferably that end of the light guide which is used for irradiating a dental material in or on a patient's tooth with light. Such a curved portion provides for a facilitated access in the patient's mouth. Further the light guide is arranged with the rear end adjacent the front end of the light mixing element. Thus the front end of the light mixing element faces the light guide, in particular the rear end of the light guide.

In an embodiment a gap is provided between the light mixing element and the polymerization light source. The gap between the light mixing element and the polymerization light source is preferably an air gap. The gap between the light mixing element and the polymerization light source preferably has a width of between 0.1 mm and 1 mm, and preferably 0.5 mm.

In an embodiment the dental light polymerization device comprises a housing that has a clear or transparent panel which is arranged between the front end of the light mixing element and the rear end of the light guide. The transparent panel is preferably spaced from the front end of the light mixing element and from the rear end of the light guide. The space between the front end of the light mixing element and the transparent panel is preferably between 0.1 mm and 3 mm, preferably 0.5 mm. Further the space between the rear end of the light guide and the transparent panel is preferably between 0.1 mm and 3 mm, preferably 0.5 mm.

In an embodiment the dental light polymerization device has an operation mode in which the first and second LED are simultaneously activated for emitting light. The operation mode may be a preferred or default operation mode. The operation mode may further be the only operation mode. Optionally the dental light polymerization device may have a further operation mode in which each of the first and second LED can be selectively used individually.

In an embodiment the first LED exhibits a first light emission range in which light is emitted over a wavelength range of plus or minus 9 nm from the first light emission peak wavelength and the second LED exhibits a second light emission range in which light is emitted over a wavelength range of plus or minus 10 nm from the second light emission peak wavelength. The first and second light emission range are defined based on the FWHM value (Full Width at Half Maximum value). For example the first LED may exhibit a first light emission range in which light is emitted over a wavelength range of 441 nm to 459 nm (FWHM) and the second LED may exhibit a second light emission range in which light is emitted over a wavelength range of 449 nm to 469 nm (FWHM). In the first light emission range any light emitted at wavelengths outside the first light emission peak wavelength exhibits a lower light intensity than light emitted at the first light emission peak wavelength. Further, in the second light emission range any light emitted at wavelengths outside the second light emission peak wavelength of the second LED exhibits a lower light intensity than light emitted at the second light emission peak wavelength.

A suitable LED that may be used as the first LED is for example available under the designation Luxeon Z Color Royal Blue, from Philips Lumileds, USA. A suitable LED that may be used as the second LED is for example available under the designation Luxeon Z Color Blue, from Philips Lumileds, USA.

In an embodiment the light mixing element is monolithically formed. Preferably the light mixing element is made of polymethyl methacrylate (PMMA) or glass. For example the light mixing element may be injection-molded in one piece.

In an embodiment the first diagonal dimension of the light mixing element is defined by a square having a first edge length. Preferably the first edge length is within a range of 2 mm to 6 mm. Preferably the second diagonal dimension of the light mixing element is defined by a square having a second edge length. Preferably the second edge length is within a range of 8 mm to 15 mm. The first edge length of the light mixing element is preferably 3.5 mm. The second edge length of the light mixing element is preferably 8 mm.

The length of the light mixing element is preferably within a range of 10 mm to 20 mm and preferably in particular 13 mm. The length of the light mixing element is preferably greater than the second edge length, preferably at least twice of the second edge length. It has been found that a greater length of the light mixing element provides for a better uniformity. On the other hand the length of the light mixing element should be limited for avoiding undue intensity losses. With the lengths specified herein an appropriate balance between maximizing uniformity and minimizing losses has been determined.

In an embodiment the front portion of the light mixing element has a spherical shape. The spherical shape is preferably based on a radius of between 12 mm and 25 mm, preferably 17 mm. Further the rear portion of the light mixing element preferably increases in the dimension from the first toward the second diagonal dimension. The light mixing element is preferably entirely transparent and surrounded by air. In particular the light mixing element may not comprise any coated and/or mirrored outer surfaces. Thus the reflections of the light passing the light mixing element are based on total reflection at the boundary of the light mixing element and the surround air.

In an embodiment the dental light polymerization device further comprises an activator button for switching the polymerization light source on or off. The dental light polymerization device further may comprise a selector button for pre-selecting a time period after which the activated polymerization light source is automatically deactivated. The dental light polymerization device may further be battery powered. In particular the handle portion may comprise a battery for powering the dental light polymerization device. The dental light polymerization device may be wireless. In particular the dental light polymerization device may have no power cord. Further the battery may be rechargeable, for example in a contactless manner.

DETAILED DESCRIPTION OF THE INVENTION

Figure 1:
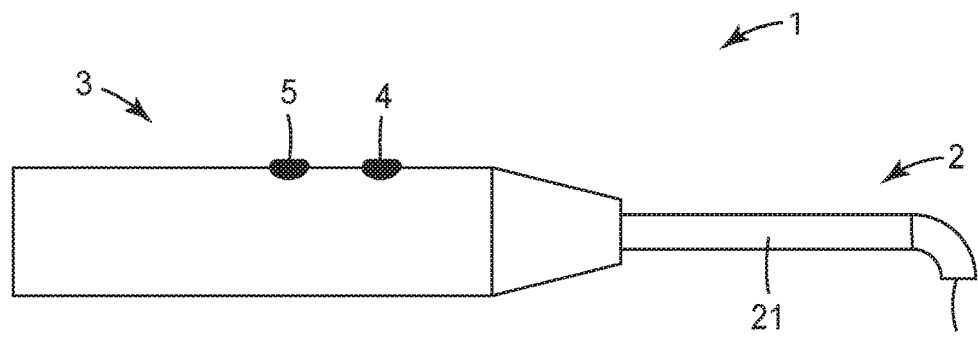
FIG. 1 is a side view of a dental light polymerization device according to an embodiment of the invention.

FIG. 1 shows a dental light polymerization device 1. The dental light polymerization device 1 has an intra-oral tip portion 2 and a handle portion 3. The intra-oral tip portion 2 comprises a light guide 21 that forms a light output 22 at a free end of the light guide 21. The dental light polymerization device 1 of the example further has an on/off button 4 and a timer setting button 5. The on/off button 4 enables a user to selectively activate and deactivate the polymerization light device 1. Further the timer setting button 5 allows the user to adjust a time period over which the polymerization light device 1 is automatically maintained activated upon activation via the on/off button 4. The on/off button further allows a user to switch the dental light polymerization device off while it is automatically maintained activated. For example, a first push and release of the on/off button 4 activates the dental light polymerization device 1 for the time period selected via the timer setting button 5. In absence of any further push of the on/off button the dental light polymerization device 1 stays activated over the time period. However, the dental light polymerization device 1 can be switched off at any time by pushing (and releasing) the on/off button during the dental light polymerization device 1 is maintained activated. The dental light polymerization device 1 can be held by the user for use at the handle portion 3.

Figure 2:
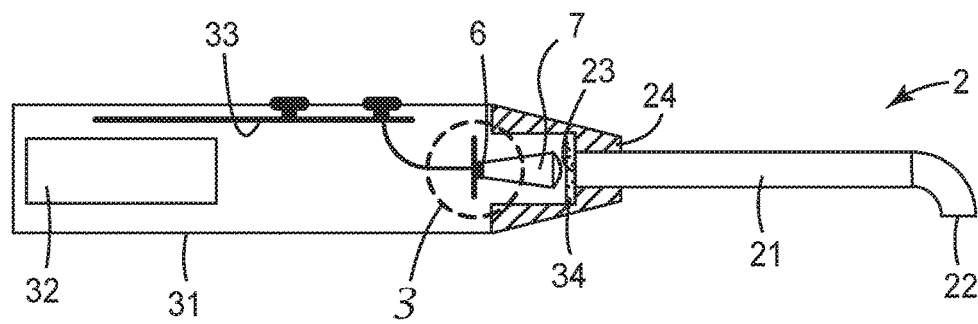
FIG. 2 is a cross-sectional view of a dental light polymerization device according to an embodiment of the invention.

FIG. 2 shows the dental light polymerization device 1 in a cross-sectional view. The dental light polymerization device 1 comprises a polymerization light source 6 for emitting blue light toward a light input 23 of the light guide 21. A light mixing element 7 is arranged between the polymerization light source 6 and the light input 23.

The intra-oral tip portion 2 comprises an attachment 24 for removably mounting the intra-oral tip portion 2 on the handle portion 3. The handle portion 3 comprises a closed housing 31. The housing 31 hermetically encapsulates the polymerization light source 6, the light mixing element 7, a battery 32 and electronic circuitry 33. In the example the housing 31 has a window that is closed by a transparent panel 34. Therefore the transparent panel 34 is arranged between the light mixing element and the light input 23 of the light guide 21.

The dental light polymerization device 1 in the example is an overall wireless device. This means that the dental light polymerization device 1 for example has no power cord but is powered by the battery 32. The battery 32 is rechargeable for example via contacts (not shown) provided on the housing 31 or wirelessly. For charging the battery 32 a charging device (not illustrated) may be provided.

Figure 3:
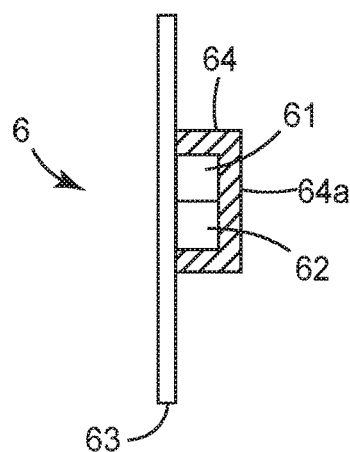
FIG. 3 is a detail view of a polymerization light source as it may be used with a dental light polymerization device according to an embodiment of the invention.
Figure 7:
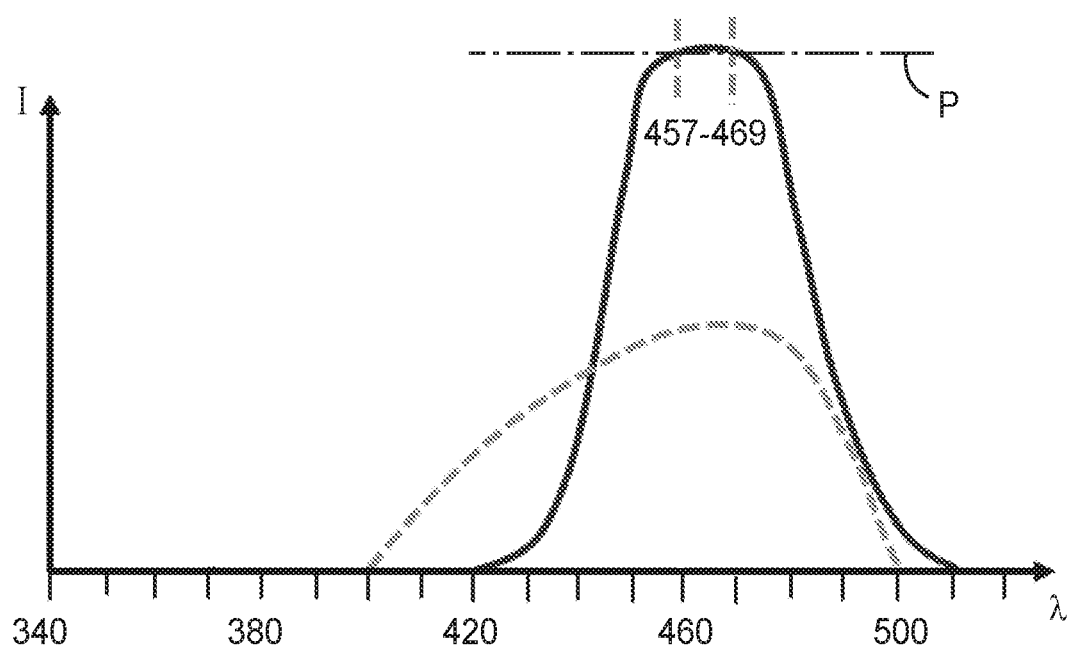
FIG. 7 is a diagram illustrating a light intensity curve for different wavelengths of the light emitted from a dental light polymerization device according to the invention.

FIG. 3 shows the polymerization light source 6 in more detail. The polymerization light source 6 comprises a first LED 61 and a second LED 62. The first and second LED 61, 62 are configured to emit light at different but overlapping wavelength ranges within the spectrum of visible violet and blue light (380 nm to 495 nm). Thus the overall polymerization light source 6 is configured to emit light over a wavelength range that is extended with respect to wavelength range of the individual first and second LED 61, 62. In particular in the example the first LED 61 is configured to emit light at a first light emission peak wavelength of 457 nm and the second LED 62 is configured to emit light at a second light emission peak wavelength of 469 nm. As shown in FIG. 7 the resulting curve (illustrated as a solid line) of the light emitted from the dental polymerization light device 1 forms a plateau P in which the light intensity I is essentially the same over a wavelength range of about 454 nm to 472 nm. Dental composite materials which comprise Camphorquinone thus can be caused to harden at an increased efficiency. The curve illustrated in the diagram of FIG. 7 in dashed lines represents the absorption spectrum of Camphorquinone.

In the example the first and second LED 61, 62 are provided in the form of dies that are bonded on an electric circuit board 63 and encapsulated by a transparent cover 64. The transparent cover 64 has a planar face 64*a* through which light emitted from the first and second LED 61, 62 is transmitted.

Figure 4:
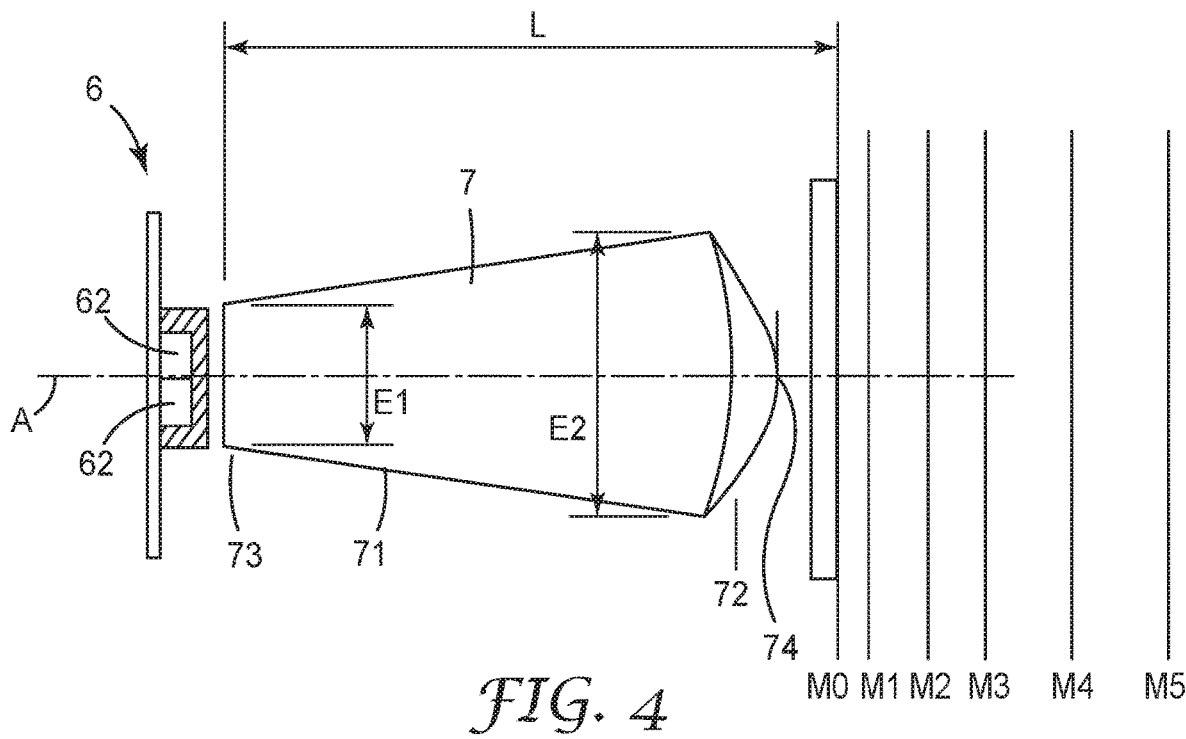
FIG. 4 is a detail view of a light mixing element as it may be used with a dental light polymerization device according to an embodiment of the invention.

FIG. 4 shows the polymerization light source 6 and the light mixing element 7 in more detail.

Figure 5:
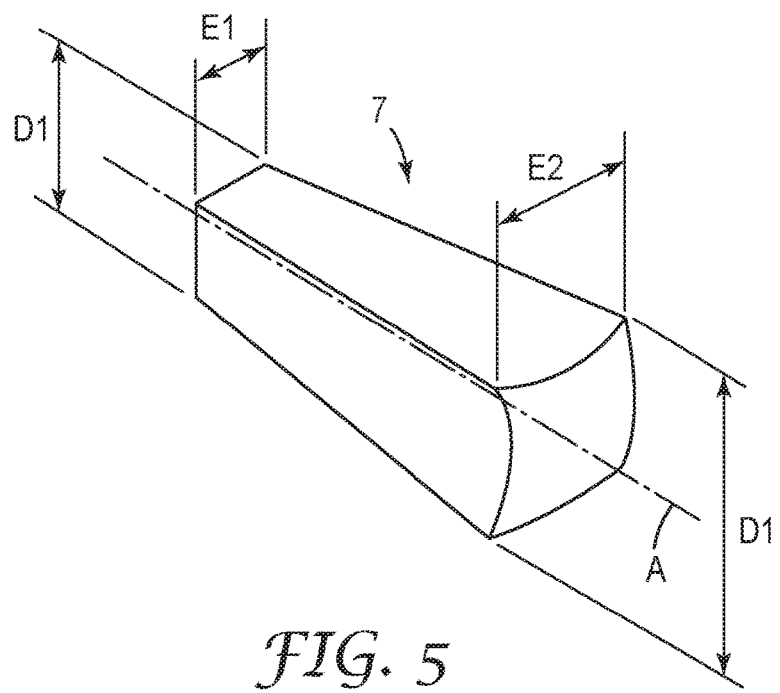
FIG. 5 is a detail view of the light mixing element of FIG. 4.

The light mixing element 7 is formed of a solid transparent body, for example made from polymethyl methacrylate (PMMA) or glass. In particular the light mixing element 7 has rear portion 71 and an adjacent front portion 72. The rear portion 71 is shaped according to a square-based truncated pyramid. The front portion 72 has a spherical outer surface that forms a front end 74 of the light mixing element 7. A symmetry axis of the light mixing element 7 forms an optical axis A. The rear portion 71 and the front portion 72 are monolithically formed. Further the light mixing element 7 is free of inner voids. The rear portion 71 at a rear end 73 of the light mixing element 7 has a first diagonal dimension D1 (see FIG. 5). The rear end 73 forms a square-shaped rear surface, with the square having a first edge length E1 that corresponds to the first diagonal dimension D1 divided by 1.41. The rear portion 71 further has a greater second diagonal dimension D2 (see FIG. 5). The second diagonal dimension D2 is based on a square-shaped cross-section, with the square of the square-shape having a second edge length E2 that corresponds to the second diagonal dimension D2 divided by 1.41. The light mixing element 7 is arranged with the rear portion 72 toward the polymerization light source 6 and with the front portion 71 away from the polymerization light source 6. The polymerization light source 6 is arranged adjacent (but not in direct contact with) the rear end 73 of the light mixing element 7 such that light emitted from the polymerization light source 6 is emitted into the light mixing element 7. In particular the polymerization light source 6 is arranged such that the first and second LED 61, 62 are arranged symmetrically relative to the optical axis A. The light emitted from the first and second LED 61, 62 thus is generally uniformly mixed in the light mixing element 7. Due to the fact that the first and second LED 61, 62 emit light at different wavelength ranges, the light emitted from the light mixing element generally forms a cumulation of the light received into the light mixing element 7. The light emitted from the light mixing element 7 finally passes the transparent panel 34 before it enters the light guide (shown in FIG. 2).

The light mixing element 7 is configured to convert light from the polymerization light source 6 into light having a uniform (or relatively uniform) light intensity distribution in a plane perpendicular to the optical axis A. The light intensity distribution of the light emitted from the polymerization light source, transmitted through the light mixing element and exiting from the transparent panel 34 was simulated using computer software. The simulation was conducted using a simulation software available under the designation LightTools from Synopsys™ Inc., USA. In this simulation the light intensity distribution of the light exiting from the transparent panel 34 was determined in a plane that is arranged directly on the transparent panel 34 and at multiple distances farther away from the transparent panel 34. Via the determination at various different distances, a variation of the light intensity distribution over a range of distances can be evaluated. A variation of the light intensity distribution over distance can be relevant in use of the dental light polymerization device 1 in a patient's mouth, for example, in case the light output (22 in FIG. 2) is placed at various distances from the patient's teeth or from the location to be irradiated with light. In that regard it is noted that although the simulation was performed relative to the transparent panel 34 the variation of the light intensity distribution is the same (or essentially the same) if determined relative to the light output of the light guide. This is because the light guide-typically formed of a bundle of parallel transparent fibers-does not (or not significantly) alter light (in particular the orientation of the light) on its way from the light input (23 in FIG. 2) toward the light output (22 in FIG. 2).

The locations at which the light intensity distribution was determined are referred to as M0 to M5. The corresponding distances are provided in Table 1:

| Location: | M0 | M1 | M2 | M3 | M4 | M5 |
| --- | --- | --- | --- | --- | --- | --- |
| Distance in mm | 0 | 1 | 3 | 5 | 7 | 10 |

Figure 6:
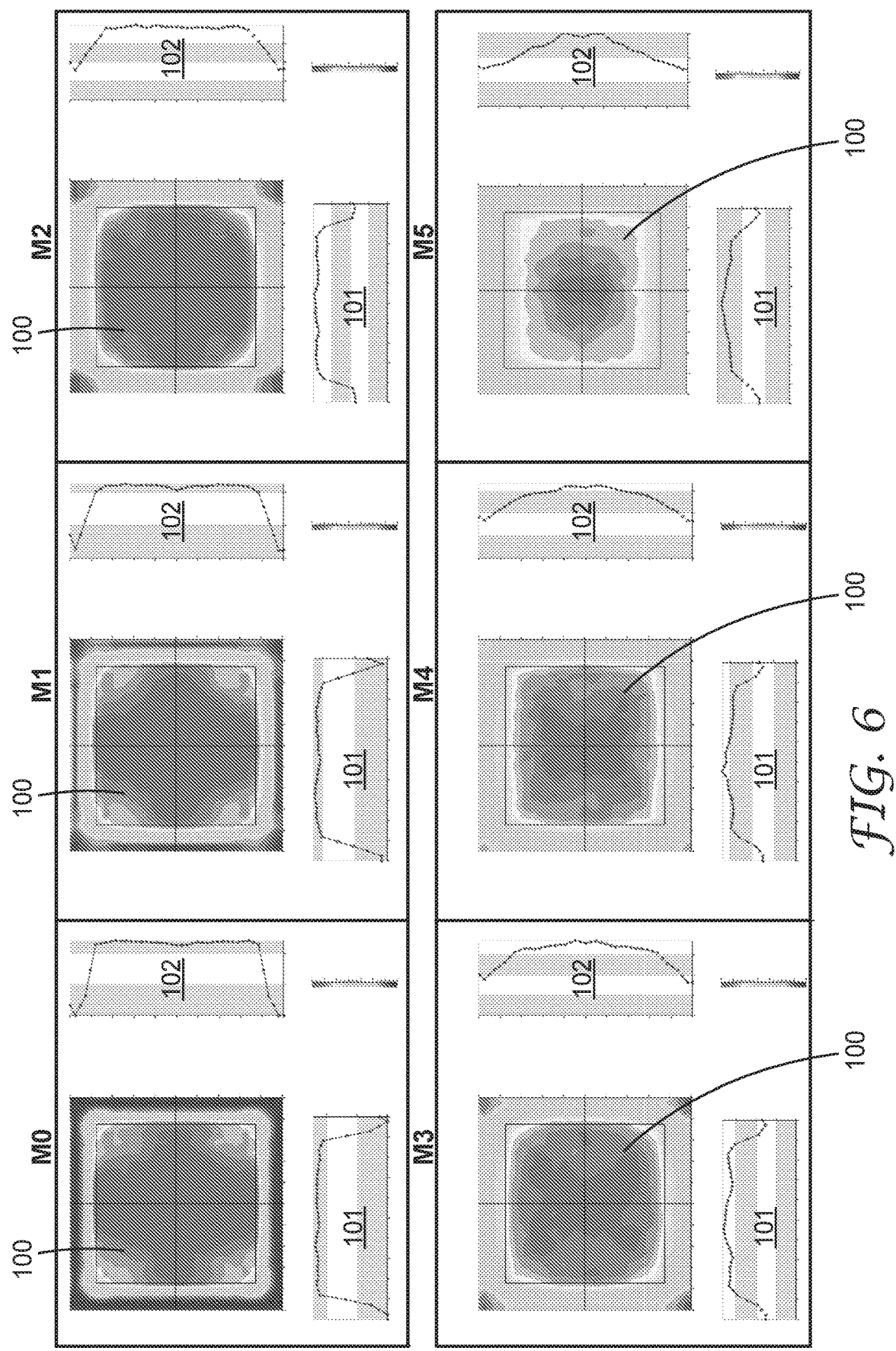
FIG. 6 is a compilation of light intensity distributions determined from a dental light polymerization device according to the invention.

The results are shown in FIG. 6. Each light intensity distribution at the locations M0 to M5 is shown in the form of a two-dimensional false color representation 100 in which different colors represent different light intensities. Each representation 100 represents light intensities determined over a reference area of 4×4 mm. The reference area is defined on a plane that is perpendicular to the optical axis of the light mixing element at the different locations M0 to M5. Further, the reference area is arranged with its center on the optical axis. An ideal uniform distribution of the light intensity is represented in a uniform color. The representation 100 at the location M0 is relatively uniformly colored. The deviation between the intensities at different locations of the area is relatively low as represented in the diagrams 101 and 102 at the location M0. Diagram 101 illustrates the light intensities of the representation 100 in the form of a curve along the Y-axis, whereas the diagram 102 illustrates the light intensities of the representation 100 in the form of a curve along the X-axis. The curves of both diagrams 101, 102 each exhibit a relatively flat portion over essentially the full range across the reference area. This demonstrates that the light intensity distribution is relatively uniform. As visible from the representations 100 at the locations M0-M3 the uniformity of the light intensity distribution does not change significantly over a distance range of 5 mm. Over a distance range of up to 10 mm (see M4 and M5) the light intensity distribution is still acceptable.

What is claimed is:

1. A dental light polymerization device, comprising an intra-oral tip portion and a handle portion, and further a polymerization light source and a light mixing element, wherein the polymerization light source comprises at least a first LED exhibiting a first light emission peak wavelength and a second LED exhibiting a second light emission peak wavelength, wherein the first and second LED each are configured for emitting visible light within a wavelength range of 380 nm to 495 nm, wherein the first and second light emission peak wavelength differ from each other by at least 10 nm, wherein the light mixing element is formed of a solid transparent body having a main body portion and an adjacent front end face extending directly from the main body portion, wherein the main body portion forms a rear end of the light mixing element and the front end face is a front end of the light mixing element, wherein the rear end forms a first diagonal dimension and the main body portion, adjacent the front end, forms a greater second diagonal dimension, and wherein the light mixing element is arranged with the rear end facing the polymerization light source and with the front end face facing away from the polymerization light source, and wherein light mixing element is encapsulated by a housing of the handle portion, the housing including a window with a transparent panel arranged between the light mixing element and the intra-oral tip portion.

2. The dental light polymerization device of claim 1, wherein the first light emission peak wavelength is a particular wavelength within a range of 440 nm to 460 nm and the second light emission peak wavelength is a particular wavelength within a range of 460 nm to 485 nm.

3. The dental light polymerization device of claim 1, wherein the intra-oral tip portion comprises a light guide having a rear end and a front end, the front end forming a light output of the dental light polymerization device, and wherein the light guide is arranged with the rear end adjacent the front end of the light mixing element.

4. The dental light polymerization device of claim 3, wherein a gap is provided between the light mixing element and the polymerization light source.

5. The dental light polymerization device of claim 1, having an operation mode in which the first and second LED are simultaneously activated for emitting light.

6. The dental light polymerization device of claim 1, wherein the first LED exhibits a first light emission range in which light is emitted over a wavelength range of plus or minus 9 nm from the first light emission peak wavelength and the second LED exhibits a second light emission range in which light is emitted over a wavelength range of plus or minus 10 nm from the second light emission peak wavelength, wherein the first and second light emission range are defined based on a Full Width at Half Maximum value.

7. The dental light polymerization device of claim 1, wherein the light mixing element is monolithically formed.

8. The dental light polymerization device of claim 7, wherein the light mixing element is made of polymethyl methacrylate.

9. The dental light polymerization device of claim 1, wherein the first diagonal dimension of the light mixing element is defined by a square having a first edge length within a range of 3 mm to 6 mm, wherein the second diagonal dimension of the light mixing element is defined by a square having a second edge length within a range of 7 mm to 10 mm, and wherein a length of the light mixing element is within a range of 10 mm to 20 mm.

10. The dental light polymerization device of claim 1, wherein the front end face of the light mixing element has a spherical outer surface.

11. The dental light polymerization device of claim 1, further comprising an activator button for switching the polymerization light source on or off, and a selector button for pre-selecting a time period after which the activated polymerization light source is automatically deactivated.

12. The dental light polymerization device of claim 1, wherein the handle portion comprises a battery for powering the dental light polymerization device.

13. The dental light polymerization device of claim 1, wherein the first light emission peak wavelength is 457 nm and the second light emission peak wavelength is 469 nm.

* * * * *